(12) United States Patent
Song et al.

(10) Patent No.: US 12,421,642 B2
(45) Date of Patent: Sep. 23, 2025

(54) CLOTHING CARE APPARATUS AND MANUFACTURING METHOD THEREFOR

(71) Applicant: SAMSUNG ELECTRONICS CO., LTD., Suwon-si (KR)

(72) Inventors: Jiyoung Song, Suwon-si (KR); Youngtae Kim, Suwon-si (KR); Jinju Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 176 days.

(21) Appl. No.: 17/991,378

(22) Filed: Nov. 21, 2022

(65) Prior Publication Data

US 2023/0090304 A1    Mar. 23, 2023

Related U.S. Application Data

(63) Continuation of application No. PCT/KR2021/003337, filed on Mar. 18, 2021.

(30) Foreign Application Priority Data

May 22, 2020   (KR) ......................... 10-2020-0061934

(51) Int. Cl.
*D06F 34/32*    (2020.01)
*C03C 17/00*    (2006.01)
*C03C 17/34*    (2006.01)
*D06F 58/10*    (2006.01)

(52) U.S. Cl.
CPC ............ *D06F 34/32* (2020.02); *C03C 17/002* (2013.01); *C03C 17/3429* (2013.01); *C03C 17/3435* (2013.01); *D06F 58/10* (2013.01); *C03C 2218/33* (2013.01)

(58) Field of Classification Search
CPC ........... D06F 58/10; D06F 73/02; D06F 34/32
See application file for complete search history.

(56) References Cited

U.S. PATENT DOCUMENTS 10,000,411 B2   6/2018  Burrows et al.
2002/0133969 A1*  9/2002  Cassella ................. D06F 58/10
                                                        34/201

(Continued)

FOREIGN PATENT DOCUMENTS

CN    107541903         1/2018
CN    110730258 A  *    1/2020  ......... C03B 23/0235

(Continued)

OTHER PUBLICATIONS

CN110730258A Machine Translation (Year: 2020).*

(Continued)

*Primary Examiner* — Spencer E. Bell
(74) *Attorney, Agent, or Firm* — STAAS & HALSEY LLP (57) ABSTRACT

A clothing care apparatus comprises: a body including a clothing care room; and a door rotatably coupled to the body and including a control panel formed at the front surface thereof, wherein the control panel comprises: glass; a coating layer provided on the glass while having an aperture; a first print layer laminated on the coating layer and having a shape corresponding to the coating layer; and a second print layer laminated on the first print layer and provided adjacent to the glass.

17 Claims, 8 Drawing Sheets

(56) References Cited

U.S. PATENT DOCUMENTS

| | | | |
|---|---|---|---|
| 2014/0126036 A1* | 5/2014 | Neuman | C03C 17/36 |
| | | | 359/267 |
| 2014/0237917 A1 | 8/2014 | Theios et al. | |
| 2015/0113825 A1* | 4/2015 | Goulet | F26B 9/06 |
| | | | 34/443 |
| 2016/0002100 A1* | 1/2016 | Melcher | B32B 17/10174 |
| | | | 204/192.27 |
| 2016/0169531 A1* | 6/2016 | Wagner | B32B 5/142 |
| | | | 264/400 |
| 2017/0192141 A1* | 7/2017 | Bon Saint Come | |
| | | | C03C 17/3663 |
| 2018/0044843 A1* | 2/2018 | Allen | D06F 39/14 |

FOREIGN PATENT DOCUMENTS

| | | |
|---|---|---|
| DE | 10 2014 118 497 A1 | 6/2016 |
| JP | 9-5506 | 1/1997 |
| JP | 2012-20502 | 11/2012 |
| JP | 2014-43982 | 3/2014 |
| JP | 2016-530580 | 9/2016 |
| KR | 10-2011-0009438 | 1/2011 |
| KR | 10-2014-0116424 | 10/2014 |
| KR | 10-1513684 | 4/2015 |
| KR | 10-1537616 | 7/2015 |
| KR | 10-2018-0097003 | 8/2018 |
| KR | 10-2019-0067031 | 6/2019 |
| KR | 10-2019-0132110 | 11/2019 |
| KR | 10-2020-0031679 | 3/2020 |

OTHER PUBLICATIONS

KR20190132110A Machine Translation (Year: 2019).*
Extended European Search Report dated Sep. 25, 2023 in European Patent Application No. 21808278.2.
E. A. Al-Nuaimy et al., "Excimer laser crystallization and doping of source and drain regions in high quality amorphous thin film transistors" Applied Physics Letters, American Institute of Physics; vol. 69, No. 25; Dec. 16, 1996. pp. 3857-3859.
International Search Report dated Jul. 5, 2021 for International Application No. PCT/KR2021/003337.
Written Opinion of the International Searching Authority dated Jul. 5, 2021 for International Application No. PCT/KR2021/003337.
Chinese Office Action dated May 23, 2025 for Chinese Application No. 202180042925.0.
European Office Action dated Jul. 11, 2025 for European Application No. 21808278.2.

* cited by examiner

CLOTHING CARE APPARATUS AND MANUFACTURING METHOD THEREFOR

CROSS-REFERENCE TO RELATED APPLICATION

This application is a continuation application, under 35 USC § 111(a), of International Application No. PCT/KR2021/003337, filed on Mar. 18, 2021, which claims priority to Korean Patent Application No. 10-2020-0061934, filed on May 22, 2020, in the Korean Intellectual Property Office, the disclosure of which is incorporated by reference herein in its entirety.

BACKGROUND

1. Field

The present application relates to a clothing care apparatus for removing dust attached to clothes or odors in the clothes and a manufacturing method therefor.

2. Description of Related Art

Clothing care apparatuses are an apparatus for performing clothes care, such as drying wet clothes, removing dust attached to clothes, or removing odors ingrained in clothes, and decreasing creases on clothes.

The clothing care apparatus includes a body provided with a chamber configured to accommodate and take care of clothes, and a door configured to open and close the chamber. A compressor and a heat exchange device configured to supply dry air to the clothes are provided inside the body, and a steam generation device configured to supply steam to the clothes is provided therein.

Accordingly, the clothing care apparatus functions to supply air or hot air generated by a blowing device to the clothes to remove dust attached to the clothes or odors ingrained in the clothes, and spray the steam generated from the steam generation device to smooth the creases formed on the clothes.

SUMMARY

A clothing care apparatus according to the spirit of the present application includes a clothing care room formed in a body of the clothing care apparatus, and a door coupleable to the body and configured to rotate so that the door opens and closes the clothing care room, the door including a control panel on a surface of the door to receive a user input and display operation information of the clothing care apparatus, wherein the control panel includes a glass, a coating layer on an upper surface of the glass and formed having a first gap, a first print layer laminated on an upper surface of the coating layer and formed having a second gap, and a second print layer laminated on an upper surface of the first print layer and provided adjacent to the glass, the first print layer, and the coating layer.

The coating layer may contain one or more selected from a group comprising of $SiN_x$ or $SiNO_x$ and a combination thereof.

The coating layer may further contain one or more selected from a group comprising of $Al_xO_y$, $Nb_xO_y$, and $SiO_x$.

The coating layer may further contain one or more selected from a group comprising of Si, Ni, Cr, Nb, Zr, Co, Ti, and Ag nanoparticles.

A content of $SiN_x$ or $SiNO_x$ may be in a range of 70 to 90 wt %.

The coating layer may be provided with a thickness of 30 to 100 nm.

When 1,000 V is applied from an insulation tester, a resistance of the coating layer may be 500 MΩ or more.

A reflectivity of the control panel may be 70% or less, and a transmittance thereof may be 20% or more.

The reflectivity of the control panel may be in a range of 20 to 70%, and the transmittance thereof may be in a range of 20 to 70%.

The glass may have a thickness of 2 to 6 mm.

The control panel may further include a protective layer formed on an upper surface of the second print layer.

The protective layer may be made of one or more selected from a group comprising of a metal oxide, a metal nitride, a metal oxynitride, and a combination thereof.

The first print layer may be provided in black, burgundy, pink, ivory, and gold.

In the second print layer, a logo or a user interface may be implemented.

The door may have a width of 18 to 25 inches.

In another aspect, a manufacturing method of a clothing care apparatus according to the spirit of the present application includes forming a coating layer by applying one or more selected from a group comprising of $SiN_x$ or $SiNO_x$ and a combination thereof to a glass, laminating a color print layer after performing strengthening heat treatment on the formed coating layer, etching the coating layer and the color print layer with a fiber laser, and forming a logo/UI print layer so as to be adjacent to the glass and laminated on an upper surface of the color print layer.

An application frequency of the fiber laser may be in a range of 50 to 100 Hz.

The etching of the coating layer and the color print layer with the fiber laser may be performed for 10 seconds to 60 seconds.

The strengthening heat treatment may be performed in a range of 650 to 700° C.

The method may further include forming a protective layer on an upper surface of the logo/UI print layer.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

A clothing care apparatus according to the spirit of the present application includes a body including a clothing care room, and a door rotatably coupled to the body and including a control panel on a front surface thereof, wherein the control panel includes a glass, a coating layer provided on an upper surface of the glass while having a gap, a first print layer laminated in a shape corresponding to an upper surface of the coating layer, and a second print layer laminated on an upper surface of the first print layer, and provided adjacent to the glass.

Since the embodiments described in this specification are only the most exemplary embodiments of the present application and do not represent all of the technical spirit of the present application, it should be understood that various equivalents or modifications that may substitute the embodiments at the time of filing this application are also included in the scope of the present application.

A singular expression used in the description may include a plural expression unless the context clearly indicates otherwise. The shapes, sizes, and the like of elements in the drawings may be exaggerated for a clear description.

In this specification, it should be understood that the term such as "comprise" or "have" is intended to specify that the features, numbers, steps, operations, components, parts, or combinations thereof described in the specification exist, and does not preclude the possibility of the presence or addition of one or more other features, numbers, steps, operations, components, parts, or combinations thereof in advance.

In addition, terms including an ordinal number such as "first" and/or "second" may be used to describe various components, but the components are not limited by the terms, and the terms are used only for the purpose of distinguishing one component from other components. For example, a first component may be named as a second component, and similarly, the second component may also be named as the first component without departing from the scope of the present application.

The symbols denoted to each operation are used to identify each operation, and these symbols do not indicate the order between the operations, and each operation may be performed differently from the stated order unless the context clearly indicates a specific order.

The present application is directed to providing a clothing care apparatus which can not only secure reflectivity and visibility by introducing a door glass having a new laminated structure, but also solve a malfunction problem due to electrical conduction, and a manufacturing method therefor.

According to a clothing care apparatus and a manufacturing method therefor according to one aspect, it is possible to provide a clothing care apparatus and a manufacturing method therefor which can not only secure reflectivity and visibility of a door, but also solve a malfunction problem due to electrical conduction.

Accordingly, it is possible to satisfy consumers' needs for an interior color matching of a clothing care apparatus.

Hereinafter, an exemplary embodiment according to the present application will be described in detail with reference to the accompanying drawings.

Figure 1:
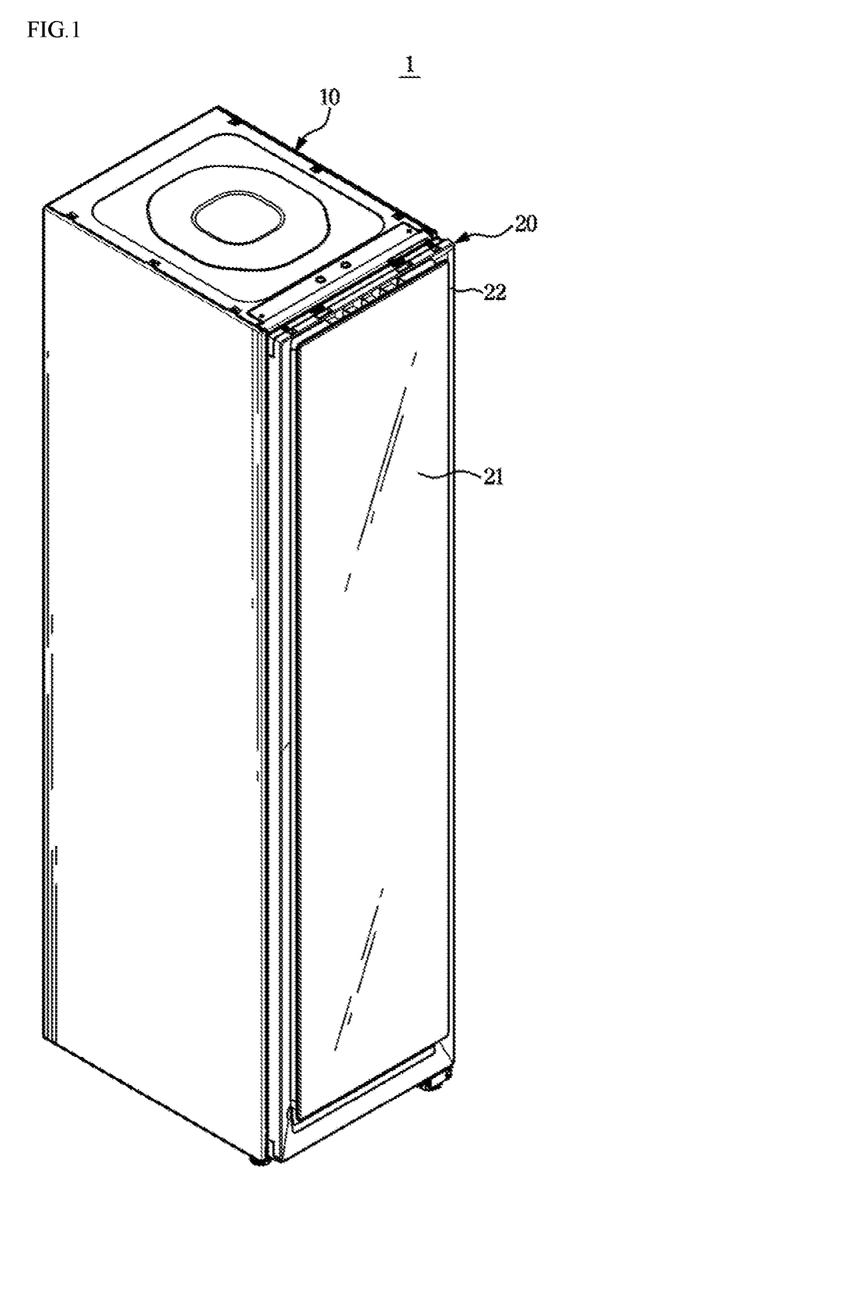
FIG. 1 is a perspective view showing a clothing care apparatus according to an embodiment of the present application.
Figure 2:
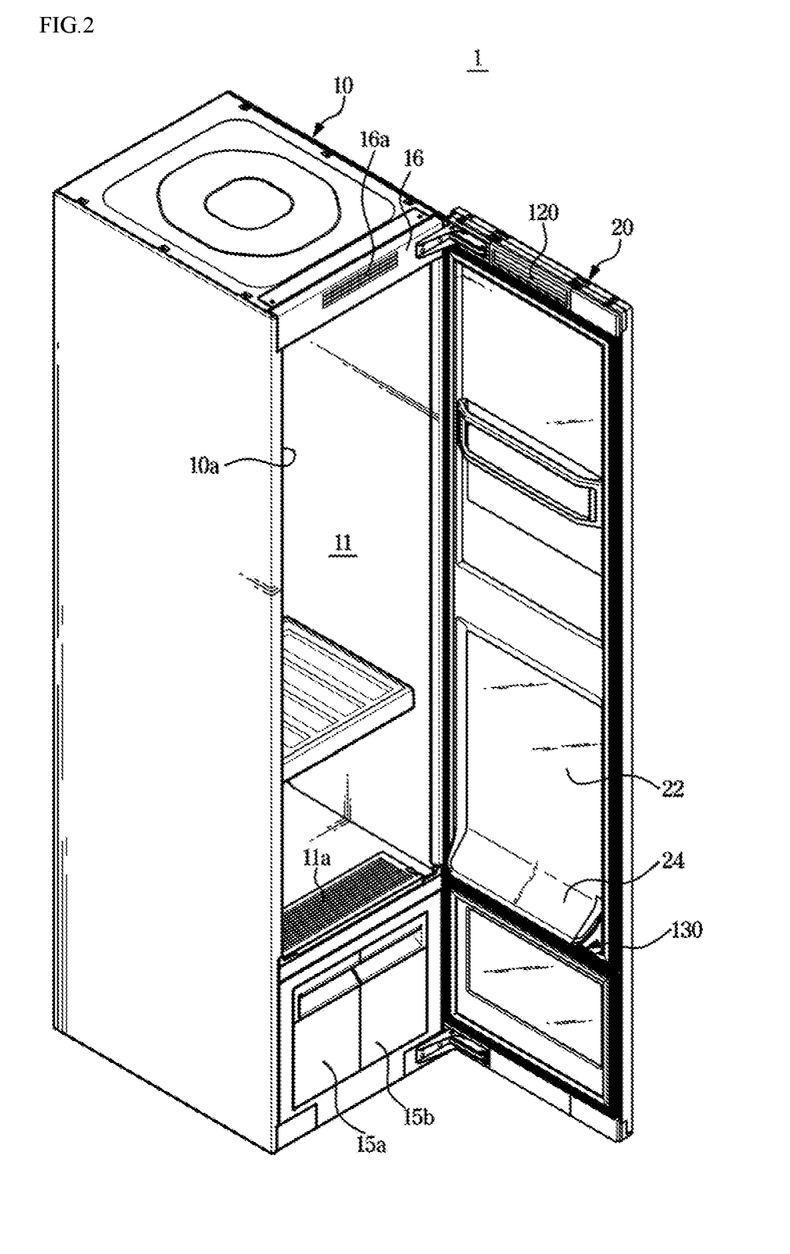
FIG. 2 is a view showing a state in which a door of the clothing care apparatus according to the embodiment of the present application is opened.
Figure 3:
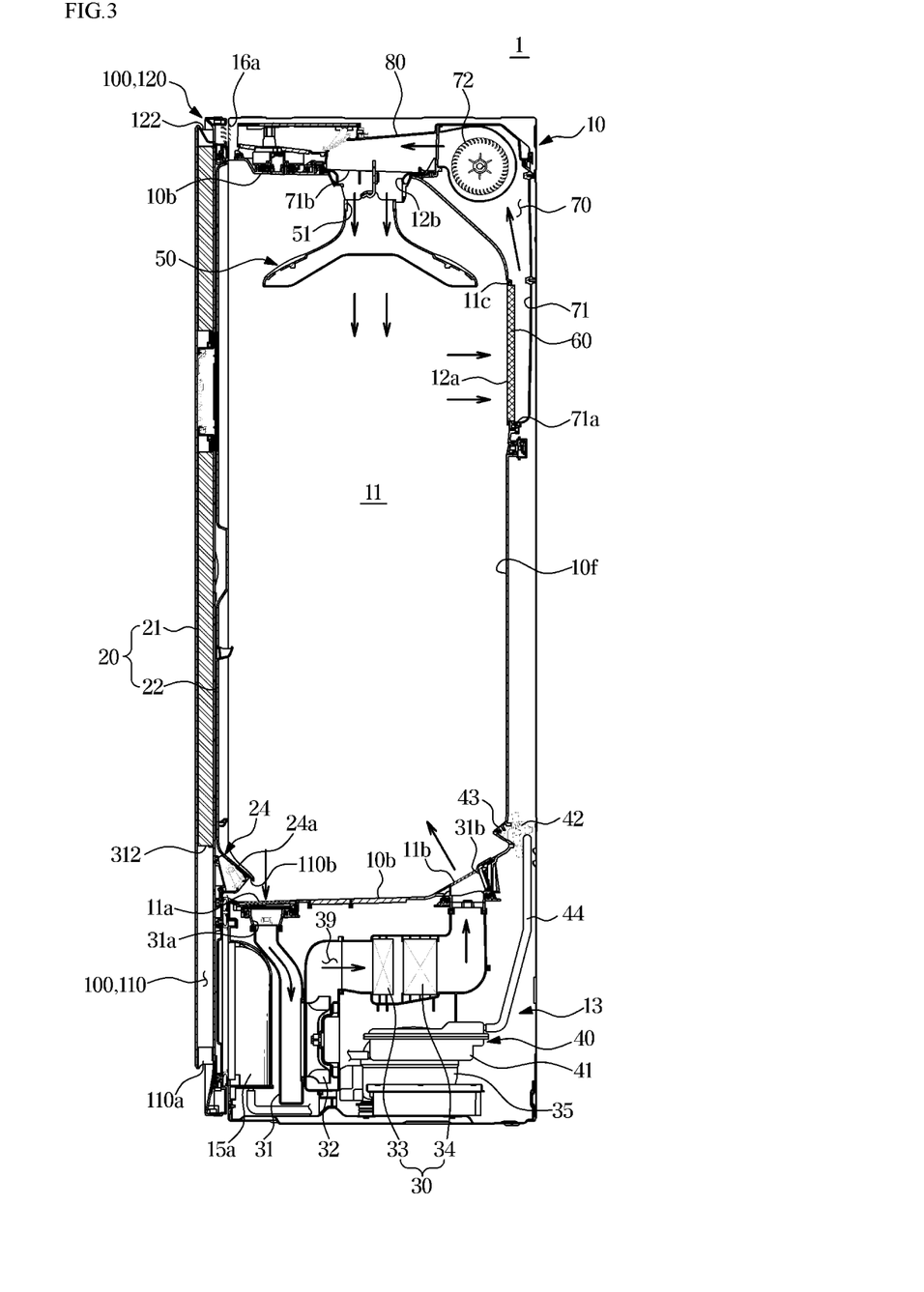
FIG. 3 is a side cross-sectional view showing the clothing care apparatus according to the embodiment of the present application.
Figure 4:
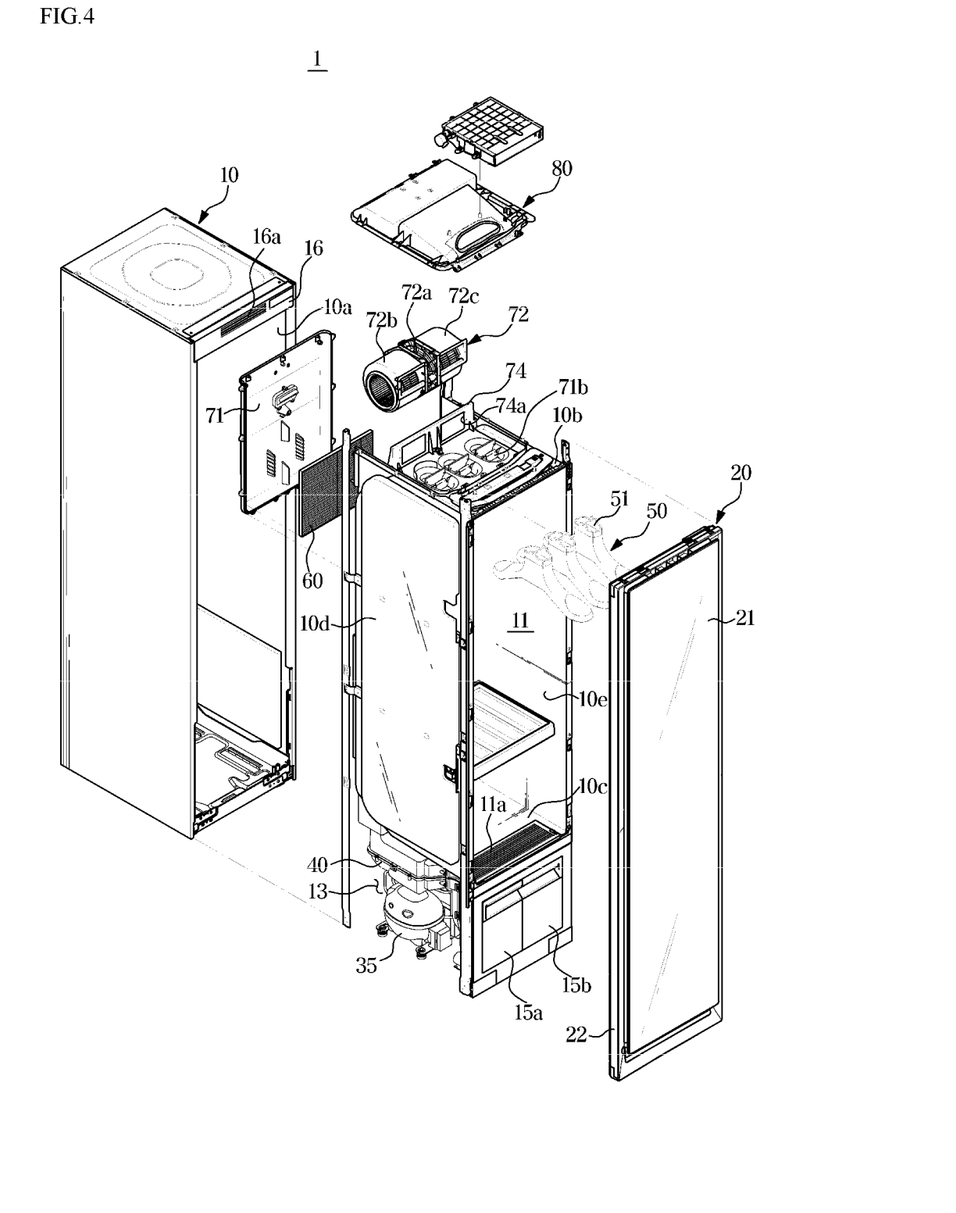
FIG. 4 is an exploded perspective view showing the clothing care apparatus according to the embodiment of the present application.

FIG. 1 is a perspective view showing a clothing care apparatus according to an embodiment of the present application, FIG. 2 is a view showing a state in which a door of the clothing care apparatus according to the embodiment of the present application is opened, FIG. 3 is a side cross-sectional view showing the clothing care apparatus according to the embodiment of the present application, and FIG. 4 is an exploded perspective view showing the clothing care apparatus according to the embodiment of the present application.

As shown in FIGS. 1 to 4, a clothing care apparatus 1 includes a body 10 forming an exterior, a door 20 rotatably coupled to the body 10, a clothing care room 11 provided inside the body 10 and configured to accommodate and take care of clothes, a clothing support member 50 provided inside the clothing care room 11 and provided to hold the clothes, and a machine room 13 provided with a heat exchange device 30 provided to dehumidify or heat air inside the clothing care room 11.

The body 10 may include the clothing care room 11 formed therein, and have a hexahedral shape with one surface open. An opening 10a is formed on a front surface of the body 10. The door 20 rotatably coupled thereto and configured to open and close the clothing care room 11 is installed in the opening 10a of the body 10. Although not shown, the door 20 may be installed through a connection member such as a hinge or a link.

The clothing care room 11 forms a space in which clothes are accommodated. The clothing care room 11 may include an upper surface 10b, a lower surface 10c, a left surface 10d, a right surface 10e, and a rear surface 10f, which are provided inside the body 10. The front surface of the clothing care room 11 is formed to be open. Accordingly, the opening of the clothing care room 11 may also be opened and closed together by the door 20 configured to open and close the opening 10a of the body 10.

A discharge bracket 16 installed at a position corresponding to a discharge flow path 120 of the door 20 to be described below may be provided at an upper end of the opening 10a of the body 10. The discharge bracket 16 may include a plurality of discharge slits 16a disposed to correspond to the discharge flow path 120 of the door 20.

The clothing support member 50 provided so that clothes may be held and supported is provided inside the clothing care room 11. The clothing support member 50 may be installed on the upper surface 10b of the clothing care room 11. The clothing support member 50 may be separably installed in the clothing care room 11. At least one clothing support member 50 may be provided. The clothing support member 50 may be formed in a shape of a hanger so that clothes may be fitted thereto.

The clothing support member 50 is provided so that air may flow therein. Dust or foreign substances attached to the clothes may be removed by the air supplied to the inside of the clothing support member 50. An air hole 51 configured to supply air to the clothes may be formed in the clothing support member 50. In the embodiment of the present application, it is shown that the air hole is formed at an upper end of the clothing support member, and the air supplied through the air hole at the upper end is supplied to the inside and outside of the clothes as an example, but the spirit of the present application is not limited thereto. For example, the air hole may be formed in various sizes at various positions so that the supplied air may be widely sprayed to the clothes.

The clothing care room 11 may include a first airflow inlet 11a and a second airflow inlet 12a, a first airflow outlet 11b and a second airflow outlet 12b, and a steam outlet 43. The first airflow inlet 11a and the first airflow outlet 11b may be formed on the lower surface 10b of the clothing care room 11. The first airflow inlet 11a may be disposed in front of the lower surface 10b of the clothing care room 11. The first airflow outlet 11b may be disposed behind the lower surface 10b of the clothing care room 11.

The first airflow inlet 11a and the first airflow outlet 11b may be disposed at positions adjacent to each other.

The steam outlet 43 may be disposed on a lower portion of the rear surface 10f of the clothing care room 11. The steam outlet 43 may be disposed above the first airflow outlet 11b.

The second airflow inlet 12a may be formed on an upper portion of the rear surface 10f of the clothing care room 11. The second airflow outlet 12b may be formed in a center of the upper surface 10b of the clothing care room 11. The second airflow inlet 12a and the second airflow outlet 12b may be disposed at positions adjacent to each other.

The second airflow outlet 12b of the clothing care room 11 may be connected to the clothing support member 50. The air discharged through the second airflow outlet 12b is transmitted to the clothing support member 50 through the air hole 51 and transmitted to the clothes held on the clothing support member 50.

A water drain tank 15a and a water supply tank 15b which are provided separably from the body 10 may be installed on a lower portion of the body 10. The water drain tank 15a and the water supply tank 15b may be disposed under the clothing care room 11. The water drain tank 15a is provided to facilitate the condensed water treatment. The water supply tank 15b stores water required for generating steam in a steam generation device 40 to be described below. The water in the water supply tank 15b is supplied to the steam generation device 40 and used to form steam. The water supply tank 15b may be installed separately from the body 10 to facilitate water replenishment.

The water drain tank 15a and the water supply tank 15b may be provided in front of the machine room 13. The machine room 13 is provided on a lower side of the body 10. The machine room 13 is provided under the clothing care room 11. The machine room 13 may include a heat exchange device 30 provided to dehumidify and heat the air inside the clothing care room 11 as necessary.

A blowing fan 32, the heat exchange device 30, and the steam generation device 40 may be disposed inside the machine room 13.

The heat exchange device 30 is installed to supply hot air to the inside of the clothing care room 11. The heat exchange device 30 includes an evaporator 33, a compressor 35, and a condenser 34 through which refrigerant circulates, and is provided to dehumidify and heat air.

As the refrigerant evaporates in the evaporator 33 of the heat exchange device 30, the latent heat of the surrounding air is absorbed to condense and remove moisture in the air. In addition, when the refrigerant is condensed in the condenser 34 by passing through the compressor 35, the latent heat is discharged toward the surrounding air to heat the surrounding air. In other words, since the evaporator 33 and the condenser 34 function as a heat exchanger, the air introduced into the machine room 13 by the blowing fan 32 is dehumidified and heated by sequentially passing through the evaporator 33 and the condenser 34.

The heat exchange device 30 installed in the machine room 13 may include a first duct 31 configured to connect the evaporator 33, the condenser 34, and the blowing fan 32, and the first duct 31 may be connected to the clothing care room 11 to form a first circulation flow path 39 which circulates between the clothing care room 11 and the first duct 31.

The first duct 31 may be connected to the first airflow inlet 11a and the first airflow outlet 11b of the clothing care room 11. One end of the first duct 31 may be connected to the first airflow inlet 11a of the clothing care room 11, and the other end thereof may be connected to the first airflow outlet 11b of the clothing care room 11. A first duct inlet 31a of the first duct 31 may be connected to the first airflow inlet 11a and a first duct outlet 31b thereof may be connected to the first airflow outlet 11b.

The air in the clothing care room 11 is introduced into the first duct 31 through the first airflow inlet 11a, and the introduced air is dehumidified and discharged back to the clothing care room 11 through the first airflow outlet 11b. In the embodiment of the present application, it is shown that the first airflow inlet is disposed in the front of the clothing care room and the first airflow outlet is disposed in the rear of the clothing care room as an example, but the spirit of the present application is not limited thereto. For example, the positions of the airflow inlet and the airflow outlet may be variously changed as necessary.

The first duct 31 is provided to dehumidify the air introduced through the first airflow inlet 11a and discharge the introduced air to the first airflow outlet 11b. The blowing fan 32 is provided on the first duct 31 and provided to suck the air in the clothing care room 11 to the inside of the first duct 31.

The machine room 13 may further include the steam generation device 40 configured to receive water from the water supply tank 15b to form steam. The steam generation device 40 may be disposed in the machine room 13. The steam generation device 40 may include a steam generator 41 connected to the water supply tank 15b and configured to receive water and generate steam, and a steam supply tube 44 configured to guide the generated steam to a steam sprayer 42. The steam sprayer 42 may be disposed on a lower rear surface of the clothing care room 11.

A heater (not shown) may be installed inside the steam generator 41 to heat water.

The clothing care room 11 may include a blowing device 72 configured to flow air therein.

The clothing care room 11 may include a second duct 71, and the blowing device 72 may be installed inside the second duct 71. The second duct 71 may be provided to communicate with the clothing care room 11 to form a second circulation flow path 70 which circulates between the clothing care room 11 and the second duct 71. The blowing device 72 may be disposed on the second circulation flow path 70.

The second duct 71 may be formed behind the second airflow inlet 12a of the clothing care room 11. The second duct 71 may be provided on an upper rear surface of the clothing care room 11 and may include a filter member 60 therein. The second duct 71 may be coupled to a top cover 80 disposed on an upper portion of the clothing care room 11. The second duct 71 may be coupled to the top cover 80 and the blowing device 72 may be installed therein. The blowing device 72 is disposed on an upper rear side of the clothing care room 11, and may include a blowing motor 72a configured to generate a rotational force and at least one blowing fan 72b rotated by the blowing motor. The blowing fan 72b may be accommodated by a fan case 72c. The fan case 72c may be coupled to a duct bracket 74 provided on the upper surface 10b of the clothing care room 11. At least one duct hole 74a is formed on the duct bracket 74, and the blowing fan 32 is coupled to each of the at least one duct hole 74a to move the air in the second duct 71 to the second airflow outlet 12b of the second duct 71.

The second duct 71 may be connected to the second airflow inlet 12a and the second airflow outlet 12b of the clothing care room 11. One end of the second duct 71 may be connected to the second airflow inlet 12a of the clothing care room 11, and the other end thereof may be connected to the second airflow outlet 12b of the clothing care room 11. The second duct inlet 71a of the second duct 71 may be connected to the second airflow inlet 12a and the second duct outlet 71b may be connected to the second airflow outlet 12b.

The second airflow outlet 12b of the clothing care room 11 may be formed at a position corresponding to the second duct outlet 71b of the second duct 71.

The second duct outlet 71b of the second duct 71 is connected to the second airflow outlet 12b of the clothing care room 11, and the second airflow outlet 12b is connected to the clothing support member 50 so that the air in the second duct 71 is transmitted to the clothing support member 50.

The blowing device 72 disposed inside the second duct 71 is provided to suck the air inside the clothing care room 11 through the second airflow inlet 12a and discharge the sucked air to the second duct outlet 71b and the second airflow outlet 12b.

The filter member 60 is provided on the second airflow inlet 12a of the clothing care room 11. The second airflow inlet 12a is formed on the rear surface 10f of the clothing care room 11. A filter member installation portion 11c configured to install the filter member 60 is provided on the rear surface 10f of the clothing care room 11. The second airflow inlet 12a may be formed at a position corresponding to the filter member installation portion 11c.

The air inside the clothing care room 11 may be filtered by the filter member 60 of the second airflow inlet 12a when introduced into the second duct 71. Dust and odors in the air introduced into the second duct 71 may be removed by the filter member 60. The air filtered by the filter member 60 may be discharged to the second duct outlet 71b and the clothing support member 50 through the blowing device 72.

The filter member 60 may include a dust collection filter (not shown) configured to remove dust or a means for deodorizing.

Accordingly, the clothing care room 11 operates in a state in which clothes are held on the clothing support member 50 and the door 20 is closed when taking care of the clothes. At this time, in the clothing care room 11, air may be circulated along the first circulation flow path 39 and the second circulation flow path 70.

The clothing care apparatus 1 includes a dehumidification flow path 100 provided on the door 20 to connect the clothing care room 11 and the outside when dehumidifying an interior. The dehumidification flow path 100 may be provided on the door 20. At least one dehumidification flow path 100 may be formed.

Figure 5:
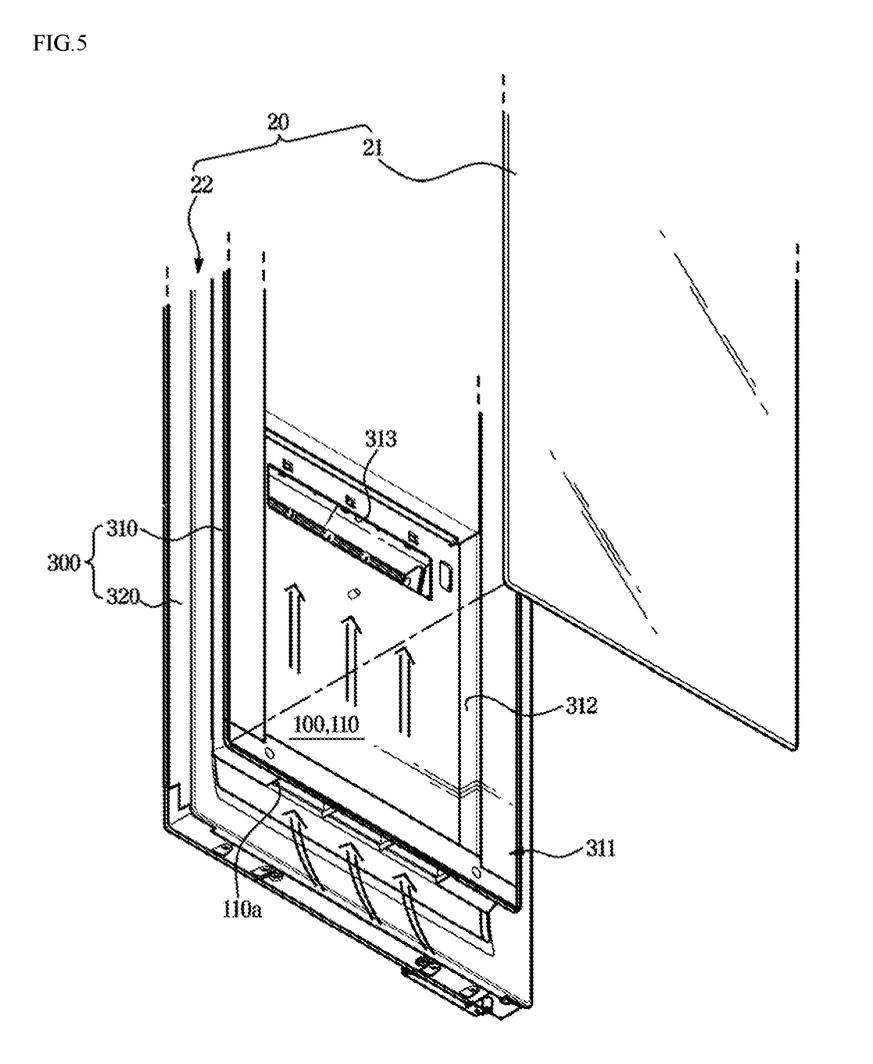
FIG. 5 is a partial exploded perspective view showing a dehumidification flow path of the door of the clothing care apparatus according to the embodiment of the present application.

FIG. 5 is a partial exploded perspective view showing the dehumidification flow path of the door of the clothing care apparatus according to the embodiment of the present application.

As shown in FIG. 5, the door 20 may include the dehumidification flow path 100 which communicates the clothing care room 11 with the outside.

The door 20 includes a first door member 21 configured to form a front surface, and a second door member 22 coupled to the first door member 21 to form a rear surface.

The dehumidification flow path 100 may be formed between the first door member 21 and the second door member 22. At least one of the dehumidification flow paths 100 may be formed between the first door member 21 and the second door member 22. The dehumidification flow path 100 may be formed on at least one of the first door member 21 and the second door member 22.

The dehumidification flow path 100 may be provided on the door 20, and may include an introduction flow path 110 for introducing outside air into the inside of the clothing care room 11, and a discharge flow path 120 for discharging the air inside the clothing care room 11 to the outside.

The first door member 21 is formed in a plate shape. The first door member 21 may include a mirror, a glass, a panel, and the like. In the embodiment of the present application, it is shown that the first door member 21 is a plate-shaped mirror as an example, but the spirit of the present application is not limited thereto. For example, the first door member may include covers made of various materials which are coupled to have a sense of unity with furniture in the interior where the clothing care apparatus 1 is installed.

The first door member 21 may be installed in front of the second door member 22 to form the exterior of the clothing care apparatus 1.

The second door member 22 may include a first door member installation portion 311 configured to install the first door member 21. The first door member installation portion 311 may be disposed in front of the second door member 22.

The second door member 22 may further include a door frame 300. The door frame 300 may include a first door frame 310 and a second door frame 320 coupled to the rear of the first door frame 310. The first door member installation portion 311 may be provided on a front surface of the first door frame 310.

The dehumidification flow path 100 may be provided on the first door frame 310. The introduction flow path 110 may be provided on the first door frame 310.

The introduction flow path 110 is provided to move the air introduced through a first inlet 111 and discharge the air to the clothing care room 11 through a first outlet 112.

The introduction flow path 110 may include an introduction flow path duct 130 configured to guide the air introduced through the first inlet 111 to move. The first outlet 112 may be formed on the introduction flow path duct 130.

The introduction flow path 110 may include a first damping device 210 provided to open and close the first outlet 112. The first damping device 210 may be provided inside the introduction flow path duct 130.

At least one surface of the first door frame 310 is provided with the first inlet 111 formed so that outside air may be introduced. The first inlet 111 is formed on a bottom surface of the first door frame 310. A plurality of first inlets 111 may be formed. An airflow introduction space 312 in which the air introduced into the first inlet 111 is accommodated may be formed between the first door frame 310 and the first door member 21. An airflow introduction hole 313 may be formed in the airflow introduction space 312. The airflow introduction hole 313 may be formed in the first door frame 310.

The second door frame 320 may be formed to have a size and shape corresponding to the opening 10a of the body 10. The second door frame 320 is provided to come into contact with the body 10 to open and close the opening 10a.

The second door frame 320 may be provided with the dehumidification flow path 100. The introduction flow path 110 may be provided on the first door frame 310. The introduction flow path duct 130 of the introduction flow path 110 may be provided on the second door frame 320. The introduction flow path duct 130 may be installed at a position corresponding to the airflow introduction hole 313 of the first door frame 310.

The outside air introduced through the first inlet 111 of the first door frame 310 is transmitted to the introduction flow path duct 130 through the airflow introduction space 312 and the airflow introduction hole 313.

As described above, the clothing care apparatus 1 according to the disclosed embodiment may include the body 10 and the door 20 rotatably coupled to the body 10. The clothing care room 11 configured to accommodate and take care of clothes may be provided inside the body 10, and the door 20 may be rotatably installed on one side of the front surface of the body 10 to open and close the clothing care room 11.

Although not shown, the door 20 may be installed through a connection member such as a hinge or a link, and the door 20 may be provided to have a width of 18 to 24 inches.

The first door member 21 may include a control panel 210 provided so that a user selects an operation of the clothing care apparatus 1. The control panel 210 provided on the front side of the door 20 may receive a user's input (e.g., a touch or button selection), and display an application (or widget included) screen.

The control panel 210 may provide a user interface corresponding to various services (e.g., capturing photo, viewing video contents, voice call, video call, data transmission, broadcast reception, or electronic payment including mobile payment).

The control panel 210 may include a touch panel 110a configured to receive the user's input (e.g., touch) and a display panel 110b configured to display clothes treatment options (or menu) which may be selected by the user, an operation time, a remaining time, and the like.

Meanwhile, the touch panel 110a may be included on the display panel 110b or formed separately from the display panel 110b. The touch panel 110a may include a button, a touch button, or a physical button displayed on the display panel 110b.

Meanwhile, the control panel 210 may be provided as a display capable of a touch input without distinguishing between the touch panel 110a and the display panel 110b. In other words, in the control panel 210, the display panel 110b and the touch panel 110a may be implemented as an integrated type (e.g., an in-cell type touch screen, or an on-cell type touch screen).

Meanwhile, the door 20 is not limited to simply opening and closing the clothing care room 11, and may be used as a mirror for checking the user's appearance.

Figure 6:
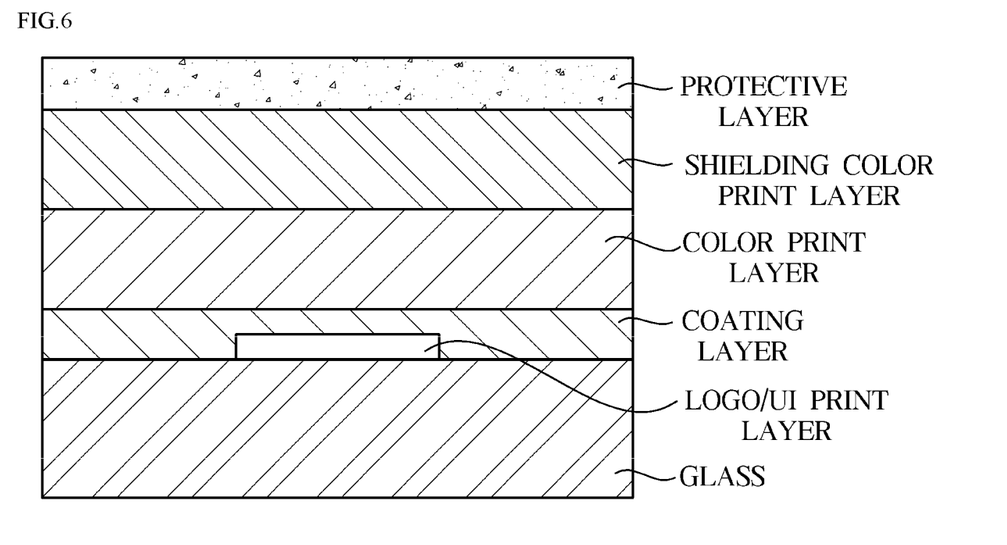
FIG. 6 is a view showing a structure of a conventional door glass.

FIG. 6 is a view showing a structure of a conventional door glass.

Referring to FIG. 6, conventionally, a mother glass is cut, an edge thereof is processed, and then a heat strengthening process is performed therefor. Next, a one-color printing (forming logo/UI print layer) for implementing the display configured to display a logo or a user interface is performed, and a coating layer is deposited using a material mixed with $SiO_2$ and $Nb_2O_5$, and then a two-color printing (forming a color print layer) for implementing a color of the door is performed. Finally, a three-color printing (forming a shielding color print layer and a protective layer) for securing a shielding force of the color print layer and securing the durability of the door is accompanied.

However, there is a limitation in design in that it is not possible to secure reflectivity and transmittance at the same time because the conventional material applied to secure the reflectivity of the door is limited to a metal or metal oxide, and the metal or metal oxide is not only vulnerable to alkali environments, but also has a malfunction problem due to electrical conduction.

Figure 7:
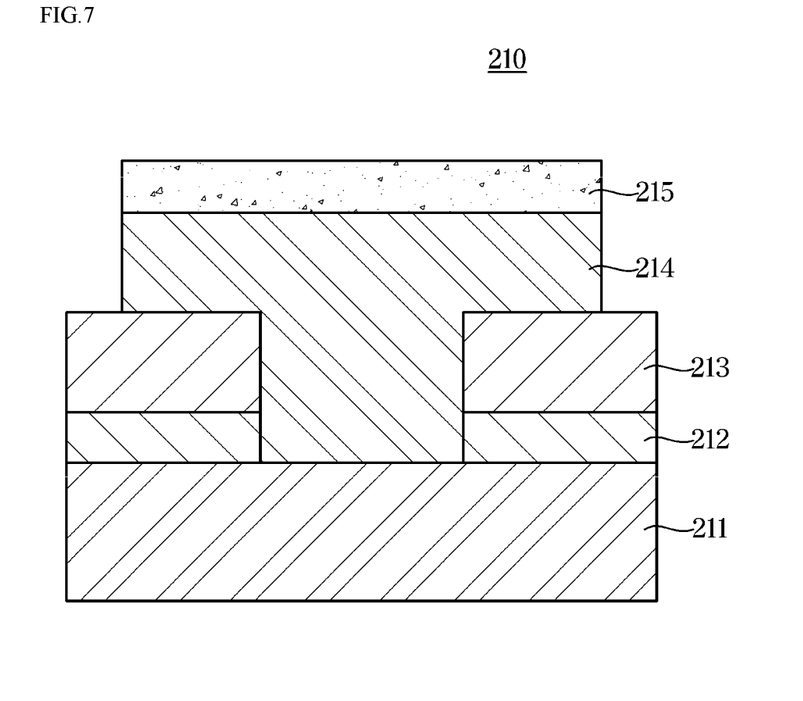
FIG. 7 is a view showing a structure of a control panel according to one embodiment of the present application.

Hereinafter, a configuration of the control panel 210 and a function of each configuration will be described in more detail. FIG. 7 is a view showing a structure of a control panel according to one embodiment of the present application.

The control panel 210 according to the disclosed embodiment may be composed of a glass 211, a coating layer 212 provided on an upper surface of the glass 211 while having a gap a first print layer 213 laminated in a shape corresponding to an upper surface of the coating layer 212, and a second print layer 214 laminated on an upper surface of the first print layer 213 and provided adjacent to the glass 211.

The glass 211 may have a flat shape on which the coating layer 212 may be placed, and may be made of a transparent material having high visible light transmittance. For example, the glass 211 may be made of a material having a visible light transmittance in a range of 80 to 100% in order to satisfy a transmittance required as a material of an upper plate of the door 20. In addition, the glass 211 may be provided with a thickness of 2 to 6 mm in consideration of durability and purpose of use of the door 20.

The coating layer 212 is a layer provided to secure the visibility and insulating property of the control panel 210, and in the present application, the coating layer 212 is made of silicon nitride, silicon oxynitride, and a combination thereof which have excellent electrical resistance.

Silicon nitride ($SiN_x$) and silicon oxynitride ($SiNO_x$) are insulating materials, and are inorganic materials having excellent mechanical properties, particularly, impact properties. In the present application, it is possible to secure the insulating property of the door 20 by applying silicon nitride ($SiN_x$) and silicon oxynitride ($SiNO_x$), which are more robust and have better durability against scratches or mechanical damage than those of $SiO_x$, and have a dielectric constant of 7.5 and a specific resistance of 0.6 Ωcm as a non-oxide ceramic, so as to be used as a material of the door 20 of the clothing care apparatus 1.

For example, $AlSiN_x$, $CrSiN_x$, $TiSiN_x$, $AlSiNO_x$, and the like may be used for silicon nitride and silicon oxynitride.

As the content of the insulating ceramic material, such as silicon nitride ($SiN_x$) or silicon oxynitride ($SiNO_x$), increases, it is possible to prevent the electrical conduction of the coating layer 212. In other words, as the content of silicon nitride ($SiN_x$) or silicon oxynitride ($SiNO_x$) increases, a resistance of the coating layer 212 increases. Accordingly, when 1,000 V is applied from an insulation tester, it is possible to secure the resistance of the coating layer to 500 MΩ or more.

When only the insulating property of the coating layer 212 is considered, the higher the content of silicon nitride ($SiN_x$) or silicon oxynitride ($SiNO_x$), the better. However, in consideration of the problem of not securing transmittance when the content of silicon nitride ($SiN_x$) or silicon oxynitride ($SiNO_x$) is too high, in the present application, the content of silicon nitride ($SiN_x$) or silicon oxynitride ($SiNO_x$) of the coating layer 212 is limited to a range of 70 to 90%.

Meanwhile, according to the disclosed embodiment, the coating layer 212 based on silicon nitride or silicon oxynitride may be doped or laminated with one or more selected from the group consisting of $Al_xO_y$, $Nb_xO_y$, and $SiO_x$.

In addition, according to the disclosed embodiment, the coating layer 212 may be doped or laminated with one or more selected from the group consisting of Si, Ni, Cr, Nb, Zr, Co, Ti, and Ag nanoparticles.

Meanwhile, as the thickness of the coating layer 212 increases, reflectivity increases. In the present application, in consideration of both the reflectivity and transmittance of the control panel 210, the coating layer 212 may be limited to a thickness of 30 to 100 nm.

Meanwhile, in FIG. 7, the gap between the coating layers 212 may be appropriately adjusted in consideration of a color, a color difference value, reflectivity, transmittance, and the like of the door according to the embodiment, and provided by etching the coating layer 212 by introducing laser marking to be described below.

The first print layer 213 is a layer provided to implement a basic color of the door 20, and may be provided in black, burgundy, pink, ivory, and gold colors. However, the color of the first print layer 213 is not limited thereto, and various colors of a high chroma series may be provided.

Referring to FIG. 7, the first print layer 213 formed on the upper surface of the coating layer 212 may be provided in a shape corresponding to the coating layer 212, and provided on a lower surface of the second print layer 214 adjacent to the glass 211.

The second print layer 214 is a layer which implements a logo in which an image of a company or organization is formed by figures, characters, symbols, or combinations thereof in order to identify manufacturers of the clothing care apparatus 1.

In addition, the second print layer 214 is a layer which implements a user interface including clothing treatment options, an operation time, a remaining time, and other menus.

Referring to FIG. 7, the second print layer 214 according to the disclosed embodiment may be provided to be laminated on the upper surface of the first print layer 213 and adjacent to the glass 211.

FIG. 7 shows that a shape of the second print layer 214 is a T-shape, but the shape of the second print layer 214 is not limited thereto and may be provided in various shapes in consideration of the logo and user interface described above as long as it is laminated on the upper surface of the first print layer 213 and adjacent to the glass 211 by being filled in the gap between the coating layer 212 and the first print layer 213.

Meanwhile, the control panel 210 according to the disclosed embodiment may further include a protective layer 215 formed on an upper surface of the second print layer 214.

When the second print layer 214 is directly exposed to the atmosphere, corrosion may occur in the long term and durability may be lowered. To solve this problem, the control panel 210 may include the protective layer 215 above the second print layer 214, that is, on the uppermost portion of the control panel 210.

The protective layer 215 may contain one or more selected from the group consisting of metal oxide, metal nitride, metal oxynitride, and a combination thereof.

According to the door 20 to which the control panel 210 including the coating layer 212 and the second print layer 214 provided as described above is applied, the following effects can be expected.

First, in the control panel 210 according to the disclosed embodiment, a transmittance of light passing in a direction from the second print layer 214 toward the coating layer 212 may be 20% or more, specifically, in a range of 20 to 70%, and a reflectivity of light may be 70% or less, specifically, in a range of 20 to 70%.

In other words, the control panel 210 according to the disclosed embodiment may be not only used as a mirror which may check the user's appearance but also implemented in various colors having high chroma by securing the reflectivity of the door 20 by introducing the gap between the coating layers 212.

In addition, the control panel 210 according to the disclosed embodiment may solve the electrical conduction problem by introducing silicon nitride ($SiN_x$) and silicon oxynitride ($SiNO_x$), which are insulating materials, into the coating layer. Specifically, when 1,000 V is applied from the insulation tester, the resistance of the coating layer may be derived to 500 MΩ or more, thereby preventing the malfunction of the clothing care apparatus due to electrical conduction.

Next, a method of manufacturing a clothing care apparatus according to another embodiment of the present application will be described.

As described above, conventionally, an individual deposition method is used to form a coating layer functioning as a mirror after cutting a mother glass.

The present application has been intended to secure the visibility (a property of easily conspicuous shape or color) of the door 20 including the control panel 210 by introducing a method of forming a coating layer on a mother glass, forming a color layer after cutting and processing the coating layer, partially removing the coating layer/print layer by laser marking, and then reprinting.

Figure 8:
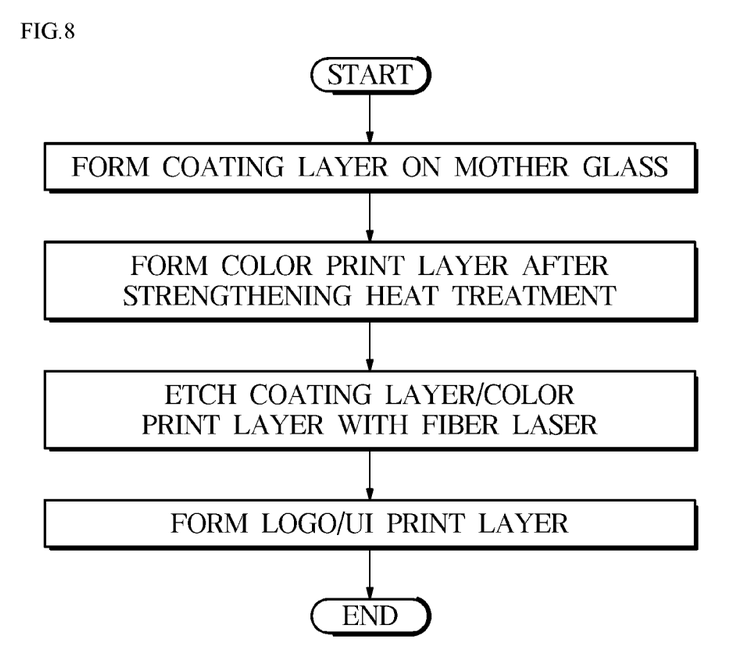
FIG. 8 is a view showing a process of manufacturing the control panel according to one embodiment of the present application.

FIG. 8 is a view showing a process of manufacturing the control panel according to one embodiment of the present application.

The method of manufacturing the clothing care apparatus according to one embodiment of the present application includes forming a coating layer by applying one or more selected from the group consisting of $SiN_x$ or $SiNO_x$ and a combination thereof to a mother glass, laminating a color print layer after performing strengthening heat treatment for the formed coating layer, etching the coating layer and the color print layer with a fiber laser, and forming a logo/UI print layer so as to be adjacent to the glass and laminated on an upper surface of the color print layer.

A control panel 210 according to one embodiment of the present application adopts a method of forming a coating layer 212 on the entire surface of a mother glass 211 and then performing processing and printing, and thus is configured to minimize variation between final products and secure process efficiency.

The coating layer 212 may be formed by coating an insulating material containing one or more selected from the group consisting of $SiN_x$ or $SiNO_x$ and a combination thereof on the mother glass 211.

In addition, the coating layer 212 may be doped or laminated with one or more selected from the group consisting of $Al_xO_y$, $Nb_xO_y$, and $SiO_x$.

In addition, the coating layer 212 may be doped or laminated with one or more selected from the group consisting of Si, Ni, Cr, Nb, Zr, Co, Ti, and Ag nanoparticles.

The method of forming the coating layer 212 on the mother glass 211 is not particularly limited thereto and may be performed by well-known methods in the art. For example, the method may include a physical vapor deposition sputtering method (DC, RF, MF and reactive coating), a chemical vapor deposition (CVD) method, a thermal deposition method, an electron beam deposition method, and the like.

Next, a process of forming the coating layer 212 on the mother glass 211, then cutting the coating layer 212 to a required size, and processing an edge by introducing a computer numeric control (CNC) method may be performed.

Thereafter, a process of performing a strengthening heat treatment for the processed coating layer 212 is performed. According to the disclosed embodiment, the heat treatment may be performed at a temperature of 650 to 700° C. In the present application, the heat treatment may be performed under a temperature condition of 650° C. or higher to improve the uniform strength of the laminated structure including the glass 211 and the coating layer 212. However, since there is a problem in that heat resistance properties of the laminated structure are degraded when the heat treatment is performed at an excessively high temperature, the temperature range of the strengthening heat treatment is limited to 700° C. or lower.

Next, a color print layer 213 is laminated on the coating layer 212 subjected to the strengthening heat treatment. The color print layer 213 is a layer provided to implement a basic color of a door 20, and may be provided in various colors such as black, burgundy, pink, ivory, and gold.

Meanwhile, in the present application, an operation of forming the color print layer 213 and then etching the color print layer 213 with a fiber laser is introduced to secure the visibility of the door 20.

For example, the etching treatment may be performed to remove the coating layer 212 and the color print layer 213 with the fiber laser after forming the color print layer 213 and before forming a logo/UI print layer 214.

The present application has been intended to solve a poor smudging problem of the print layer and a print quality degradation problem due to damage to the glass, and secure surface quality of the door by controlling a frequency of the fiber laser to 50 to 100 Hz.

The etching treatment process may be performed for 10 to 60 seconds in consideration of cost and productivity according to a process load.

Next, the logo/UI print layer 214 is formed to be adjacent to the glass 211 and laminated on an upper surface of the color print layer 213.

The logo/UI print layer 214 is a layer provided to implement a logo or a user interface on the door 20, and may be provided ~.

Meanwhile, the manufacturing method of the clothing care apparatus according to the disclosed embodiment may further include forming a protective layer on an upper surface of the logo/UI print layer. The protective layer 215 may contain one or more selected from the group consisting of metal oxide, metal nitride, metal oxynitride, and a combination thereof.

Hereinafter, the visibility and conductivity of the door 20 according to the material of the coating layer 212 constituting the control panel 210 according to the disclosed embodiment will be described in detail. Examples to be described below are provided only to help the understanding of the application, and the technical spirit of the application is not limited by the examples to be described below.

A coating layer was formed on a glass substrate through a series of processes such as cutting-CNC processing-strengthening heat treatment after depositing a coating material using $SiN_x$ and $SiNO_x$ series as a main component on the glass substrate by a PVD sputtering method. At this time, the strengthening heat treatment was performed at 665° C. for 10 minutes.

Thereafter, color print layers having colors according to Tables 1 to 3 were formed through a one-color printing process. Next, a laser marking process was performed under conditions of a speed of 1,700 m/s, a frequency of 70 Hz, and a power of 80% to etch the coating layer and the color print layer, and then bond the logo/UI print layer to the glass together with the color print layer. Finally, the door 20 of the clothing care apparatus 1 was manufactured by laminating the uppermost protective layer.

The results of the reflectivity, transmittance, color difference value, and continuity test (1,000 V was applied from the insulation tester) of the front surface and coating surface of the door glass are shown in Tables 1 to 3 below.

In Tables 1 to 3, L refers to a brightness index of the color, and a* and b* refer to chroma indexes of the color.

TABLE 1

| Items | | Comparative Example 1 | | | Example 1 | | | Example 2 | | |
|---|---|---|---|---|---|---|---|---|---|---|
| Glass | Surface | Front surface | | Coating surface | Front surface | | Coating surface | Front surface | | Coating surface |
| | Color | Bare | Black | Bare | Bare | Black | Bare | Bare | Black | Bare |
| Reflectivity (%) | | 28 | 27 | 35 | 25.4 | 23 | 42.4 | 33.7 | 27.2 | 34.1 |
| Transmittance (%) | | 40 | — | 40 | 26.0 | — | 26.0 | 40.0 | — | 40.0 |
| Color difference value | L | 80.24 | 65.96 | 79.84 | 68.27 | 57.69 | 76.54 | 80.1 | 60.28 | 73.52 |
| | a* | 2.02 | −1.05 | 2.16 | −1.75 | −3.14 | −1.19 | −2.19 | −4.61 | −1.9 |
| | b* | 8.44 | −3.13 | 7.04 | −3.28 | −8.04 | 2.94 | 0.98 | −8.66 | 15.06 |
| Conductivity (1000 V) | | Non-conduction (2,000 MΩ) | | | Non-conduction (2,000 MΩ) | | | Non-conduction (4,000 MΩ) | | |
| Color | | Crystal Black | | | Crystal Black | | | Crystal Black | | |

TABLE 2

| Items | | Example 3 | | | Example 4 | | |
|---|---|---|---|---|---|---|---|
| Glass | Surface | Front surface | | Coating surface | Front surface | | Coating surface |
| | Color | Bare | Burgundy R | Bare | Bare | Burgundy B | Bare |
| Reflectivity (%) | | 33.7 | 28.6 | 34.1 | 33.8 | 28.2 | 36.7 |
| Transmittance (%) | | 40.0 | — | 40.0 | — | — | 42.0 |
| Color | L | 80.10 | 63.57 | 73.52 | 78.58 | 63.38 | 71.64 |

TABLE 2-continued

| Items | | Example 3 | | | Example 4 | |
|---|---|---|---|---|---|---|
| difference | a* | −2.19 | −1.20 | −1.9 | −4.6 | −2.13 | −1.38 |
| value | b* | 0.98 | −4.14 | 15.06 | −4.18 | −2.93 | 16.24 |
| Conductivity (1000 V) | | Non-conduction (4,000 MΩ) | | | Non-conduction (2,000 MΩ) | |
| Color | | Burgundy | | | Burgundy | |

TABLE 3

| Items | | Example 5 | | | Example 6 | | |
|---|---|---|---|---|---|---|---|
| Glass | Surface | Front surface | | Coating surface | Front surface | | Coating surface |
| | Color | Bare | Pink | Bare | Bare | Ivory | Bare |
| Reflectivity (%) | | 29.8 | 34.5 | 34.8 | 51.5 | 40.7 | 41.4 |
| Transmittance (%) | | 64 | — | 62 | 40 | | 43 |
| Color | L | 88.81 | 71.69 | 87.91 | 93.18 | 88.35 | 90.69 |
| difference | a* | −0.70 | 1.71 | −0.26 | 0.27 | −2.50 | 0.01 |
| value | b* | −7.12 | 0.51 | 2.12 | −4.26 | 2.56 | −0.90 |
| Conductivity (1000 V) | | Non-conduction (4,000 MΩ) | | | Non-conduction (2,000 MΩ) | | |
| Color | | Pink | | | Ivory | | |

Referring to Tables 1 to 3, when the coating layer containing silicon nitride ($SiN_x$) or silicon oxynitride ($SiNO_x$) is applied to the door glass according to the present application, it can be seen that it is possible to secure both reflectivity and transmittance, which have a complementary relationship, thereby improving visibility.

Specifically, in Examples 1 to 6, it was found that the reflectivity was 70% or less, and the transmittance was 20% or more.

In addition, in all of Examples 1 to 6, since it was found that the measured resistance was 500 MΩ or more when 1,000 V was applied from the insulation tester, it was confirmed that the required physical property standards for solving the malfunction problem due to electrical conduction were satisfied.

Meanwhile, Comparative Example 1 is a case in which $SiO_2$ and $Nb_2O_5$ are applied as a material of the coating layer, and it was found that the measured resistance was 0.5 MΩ when 1,000 V was applied from the insulation tester.

As described above, the control panel according to the disclosed embodiment may provide the clothing care apparatus capable of interior color matching by not only solving the malfunction problem due to electrical conduction but also securing reflectivity and transmittance at the same time by applying silicon nitride or silicon oxynitride, which is the insulating material, as the material of the reflective layer.

In addition, the control panel according to the disclosed embodiment may adopt the method of forming the coating layer on the entire surface of the mother glass, and then performing processing and printing, thereby minimizing variation between the final products and securing process efficiency.

In the above, specific embodiments have been shown and described. However, the present application is not limited to the above-described embodiments, and those skilled in the art to which the application pertains will be able to variously change the application without departing from the gist of the technical spirit of the application described in the appended claims.

According to a clothing care apparatus and a manufacturing method therefor according to one aspect, it is possible to provide a clothing care apparatus and a manufacturing method therefor which can not only secure the reflectivity and visibility of a door but also solve a malfunction problem due to electrical conduction.

Accordingly, it is possible to satisfy consumers' needs for an interior color matching of the clothing care apparatus.

What is claimed is:

1. A clothing care apparatus comprising:
a clothing care room formed in a body of the clothing care apparatus; and
a door coupled to the body and configured to rotate so that the door opens and closes the clothing care room; and
a control panel on a surface of the door and configured to receive a user input and to display operation information of the clothing care apparatus, the control panel including:
a glass;
a coating layer on an upper surface of the glass and having a first gap, the coating layer including $SiN_x$ and/or $SiNO_x$,
a first print layer on an upper surface of the coating layer and having a second gap corresponding to the first gap so that the first gap and the second gap are aligned, and
a second print layer on an upper surface of the first print layer and filled in the first gap and the second gap so that the second print layer is adjacent to the glass, the first print layer, and the coating layer,
wherein when 1,000 V is applied from an insulation tester, a resistance of the coating layer is 500 MΩ or more,
a reflectivity of the second print layer is 70% or less, and
a transmittance through a combination of the glass, the coating layer, and the first print layer is 20% or more.

2. The clothing care apparatus of claim 1, wherein the coating layer further includes $Al_xO_y$, $Nb_xO_y$, and/or $SiO_x$.

3. The clothing care apparatus of claim 1, wherein the coating layer further includes Si, Ni, Cr, Nb, Zr, Co, Ti, and/or Ag nanoparticles.

4. The clothing care apparatus of claim 1, wherein a content of $SiN_x$ and/or $SiNO_x$ is in a range of 70 to 90 wt %.

5. The clothing care apparatus of claim 1, wherein coating layer has a thickness of 30 to 100 nm.

6. The clothing care apparatus of claim 1, wherein the reflectivity of the second print layer is in a range of 20 to 70%, and the transmittance through the combination of the glass, the coating layer, and the first print layer is in a range of 20 to 70%.

7. The clothing care apparatus of claim 1, wherein the glass has a thickness of 2 to 6 mm.

8. The clothing care apparatus of claim 1, wherein the control panel further includes a protective layer formed on an upper surface of the second print layer.

9. The clothing care apparatus of claim 8, wherein the protective layer is made of a metal oxide, a metal nitride, and/or a metal oxynitride.

10. The clothing care apparatus of claim 1, wherein the first print layer includes black, burgundy, pink, ivory, and/or gold.

11. The clothing care apparatus of claim 1, wherein in the second print, layer includes a logo or a user interface.

12. The clothing care apparatus of claim 1, wherein the door has a width of 18 to 25 inches.

13. A method of manufacturing a control panel of a clothing care apparatus, the control panel including a glass, a coating layer on an upper surface of the glass and having a first gap, the coating layer including $SiN_x$ and/or $SiNO_x$, a first print layer on an upper surface of the coating layer and having a second gap corresponding to the first gap so that the first gap and the second gap are aligned, and a second print layer on an upper surface of the first print layer and filled in the first gap and the second gap so that the second print layer is adjacent to the glass, the first print layer, and the coating layer, the method comprising:

forming the coating layer by applying $SiN_x$ and/or $SiNO_x$ to the upper surface of the glass;

heat treating the coating layer to strengthen the coating layer;

forming the first print layer on the heat treated coating layer;

etching the coating layer and the first print layer with a fiber laser to form the first gap in the coating layer and the second gap corresponding to, and aligned with the first gap, in the first print layer; and forming the second print layer on an upper surface of the first print layer and filling the first gap and the second gap so that the second print layer is adjacent to the glass, the first print layer, and the coating layer, so as to produce the control panel, wherein when 1,000 V is applied from an insulation tester, a resistance of the coating layer is 500 MΩ or more, a reflectivity of the second print layer is 70% or less, and a transmittance through a combination of the glass, the coating layer, and the first print layer is 20% or more.

14. The method of claim 13, wherein the etching includes applying the fiber laser in a frequency range of 50 to 100 Hz.

15. The method of claim 13, wherein the etching includes etching for 10 seconds to 60 seconds.

16. The method of claim 13, wherein the heat treating includes heat treating in a range of 650 to 700° C.

17. The method of claim 13, further comprising forming a protective layer on an upper surface of the second print layer.

* * * * *